Figure 1:
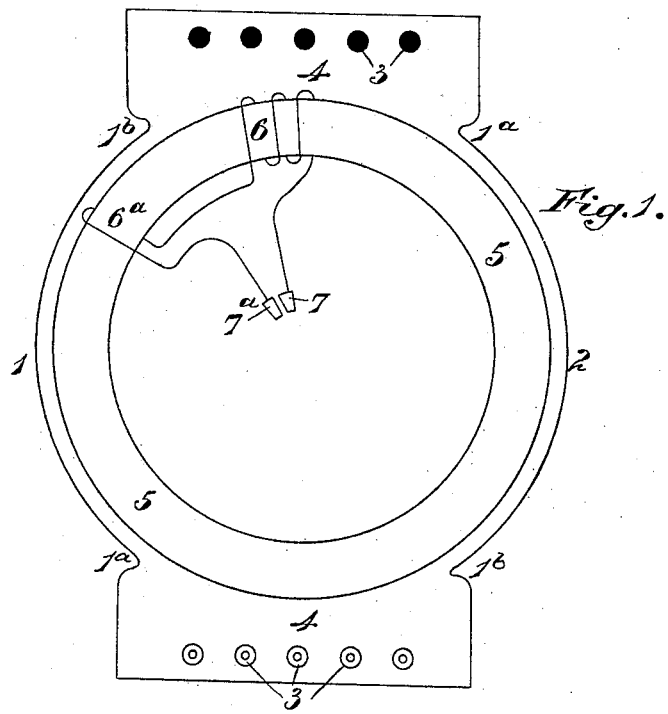

No. 653,963.  Patented July 17, 1900.
W. M. MORDEY.
DYNAMO ELECTRIC MACHINE.
(Application filed Oct. 25, 1898.)

(No Model.)  4 Sheets—Sheet 1.

Witnesses:
C. Holloway
M. C. Pinckney

Inventor:
William Morris Mordey
By J. M. Bowen
Attorney

No. 653,963. Patented July 17, 1900.
W. M. MORDEY.
DYNAMO ELECTRIC MACHINE.
(Application filed Oct. 25, 1898.)
(No Model.) 4 Sheets—Sheet 2.

Witnesses:
C. Holloway
M. C. Pinckney

Inventor
William Morris Mordey
By J. Ell Bowen
Attorney

No. 653,963. Patented July 17, 1900.
W. M. MORDEY.
DYNAMO ELECTRIC MACHINE.
(Application filed Oct. 25, 1898.)
(No Model.) 4 Sheets—Sheet 3.

Witnesses:
C. Holloway
H. C. Pinckney

Inventor.
William Morris Mordey
By J. E. McDowell
Attorney.

No. 653,963. Patented July 17, 1900.
W. M. MORDEY.
DYNAMO ELECTRIC MACHINE.
(Application filed Oct. 25, 1898.)

(No Model.) 4 Sheets—Sheet 4.

Witnesses:
C. Holloway
H. C. Pinckney

Inventor:
William Morris Mordey
By J. Ell Dowell
Attorney.

UNITED STATES PATENT OFFICE.

WILLIAM MORRIS MORDEY, OF LONDON, ENGLAND.

DYNAMO-ELECTRIC MACHINE.

SPECIFICATION forming part of Letters Patent No. 653,963, dated July 17, 1900.

Application filed October 25, 1898. Serial No. 694,516. (No model.)

*To all whom it may concern:*

Be it known that I, WILLIAM MORRIS MORDEY, a subject of the Queen of Great Britain and Ireland, residing at Westminster, in the city of London, England, have invented Improvements in Dynamo-Electric Machines, of which the following is a specification.

This invention has for its object improvements in dynamos.

In the specifications of other applications for Letters Patent filed by me, dated, respectively, February 15, 1897, Serial No. 623,451, and December 30, 1897, Serial No. 664,767, I have described improved constructions of dynamos comprising the combination of a suitable field-magnet and a slotted or toothed ring-armature and of a suitable field-magnet and a slotted or toothed drum-armature, the armature-winding in each case being so arranged that opposing electromotive forces are produced in two connected portions of each element of the winding at the moment of commutation, but that during the greater portion of the revolution of the armature mutually-aiding electromotive forces are produced in the respective portions of the elements of the winding. In other words, the arrangement of the winding is such that at the moment of commutation both the forward part of the element and the rearward part of the element have electromotive forces generated in them; but these electromotive forces are in opposite directions. By an "element" is meant the portions of the winding so connected and which in the case of a direct-current dynamo come between the adjacent sectors of the commutator or are commutated as a whole. By the described method of winding a slotted armature I am able to obtain improved and useful results. By the balance or approximate balance of opposing electromotive forces at the time of commutation I am enabled to collect from portions of the armature situated in an active field instead of, as usual, from portions approximately in inactive or neutral positions, whereby while obviating sparking certain advantages are obtained. Thus the effect of the armature-winding in producing a demagnetizing action is greatly reduced. According to the present invention I carry this advantage further and cause the armature reaction to assist the magnetic system of the dynamo by supplying magnetizing force in an assisting direction. I attain this object by so dividing and arranging or splaying the portions of each element of the winding on a slotted, notched, toothed, tunneled, or like armature-core (hereinafter included in the term "slotted armature") that at the moment of commutation one portion of the said element shall have produced in it an electromotive force considerably greater than that of other similar portions of the element, but so that a balance of electromotive forces is obtained at the moment of commutation between, say, one turn, or it may be one bar, of the element of the winding and the electromotive forces in all the rest of the element. Such a result I obtain, for example, by dividing the element into unequal portions, which in the case of a Gramme winding can be done by making one portion with a greater number of turns than the other and in the case of a drum-winding by making the element consist of a short chord and a long chord or diametrical winding, the two portions in each case being connected in series between the adjoining sectors of the commutator, and so constituting an element. By arranging such elements in successive order I obtain not merely a balance or neutralization of the directions of current in the successive conductors in the neighborhood of the neutral line, but an actual preponderance of current in one direction over that in the other, whereby the armature-conductor is caused to exert an actual useful magnetizing force on the magnetic system of the machine instead of the demagnetizing reaction of ordinary constructions. The several turns or bars of each element may with advantage be distributed over three or more slots in the armature-core, preferably over as many slots as there are turns or bars in the element.

Figure 3:
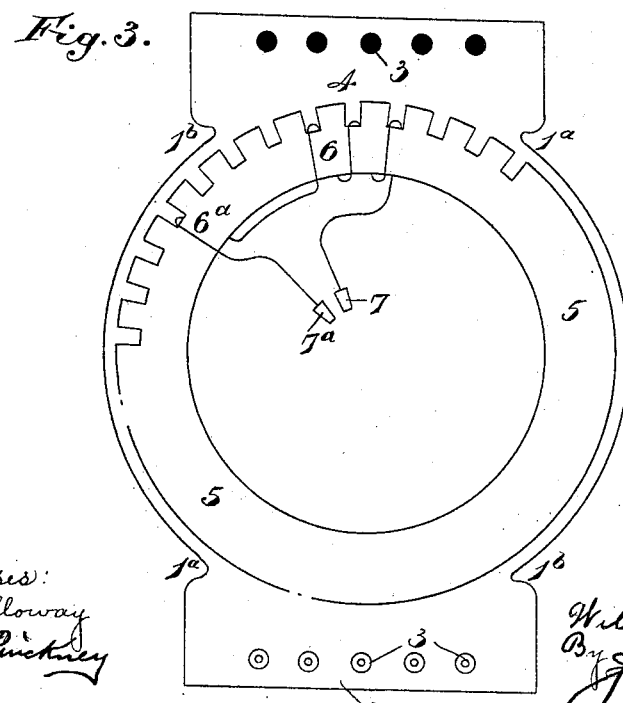
Figure 6:
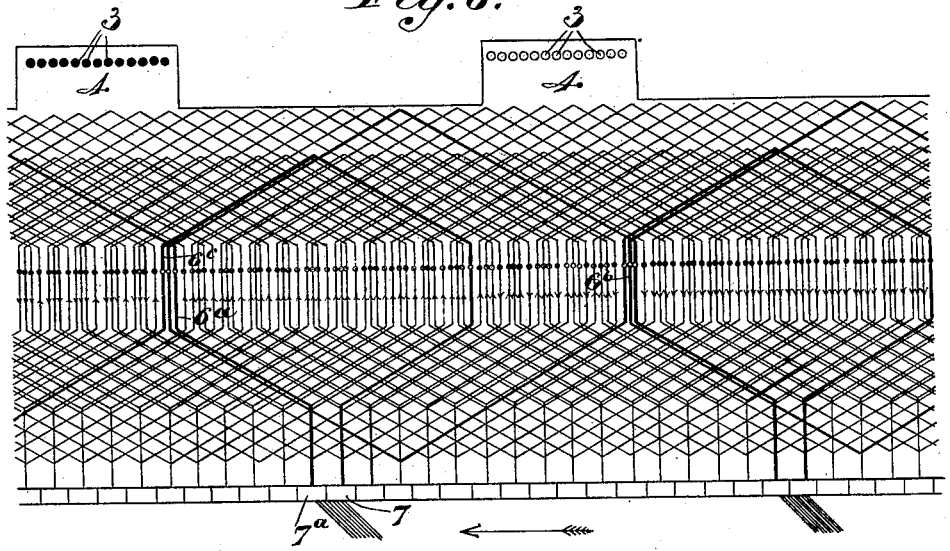
Figure 2:
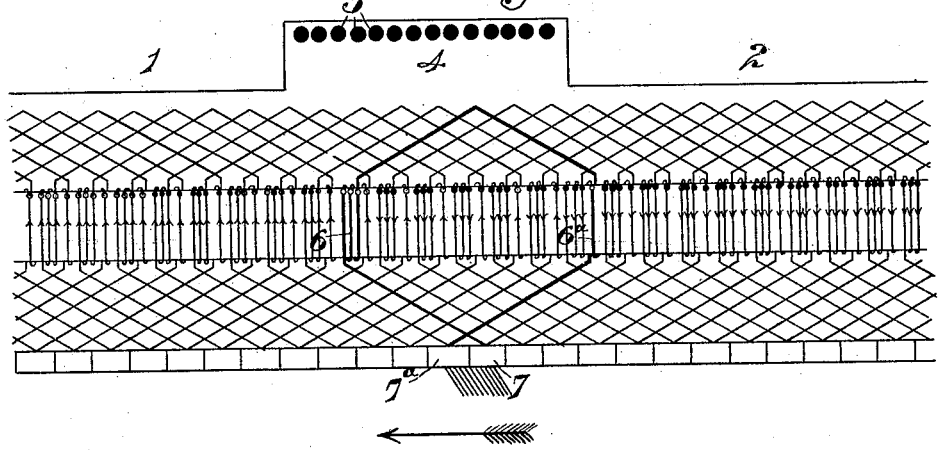
Figure 4:
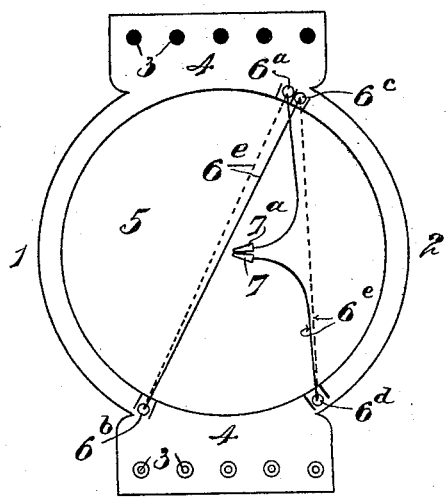
Figure 5:
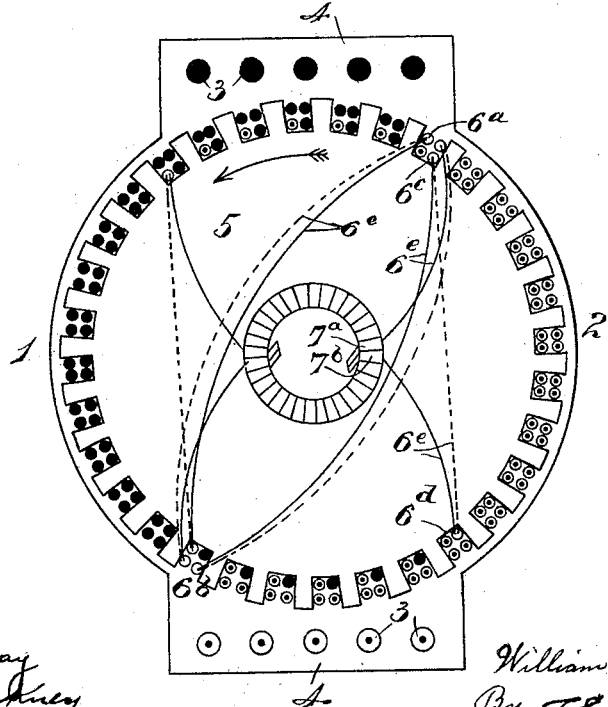
Figure 7:
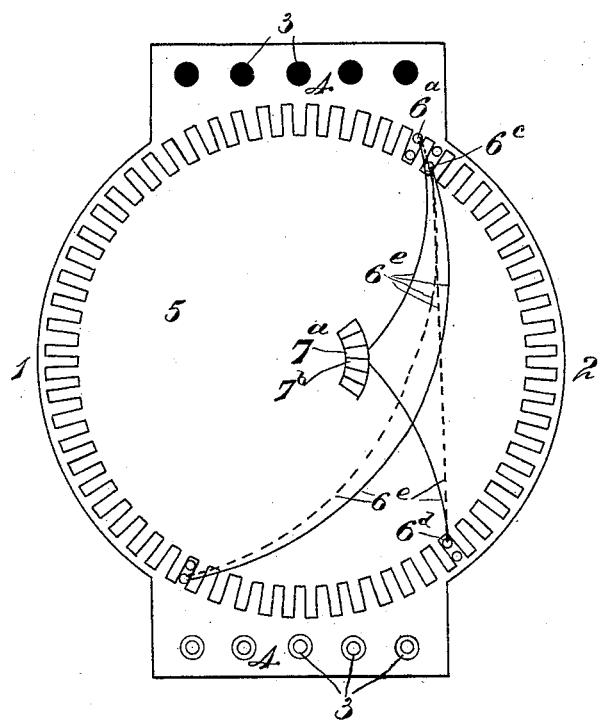

Figure 1 of the accompanying illustrative drawings shows diagrammatically in end view one element of a ring-armature winding arranged according to this invention. In this figure the teeth on the armature-core are omitted for the sake of clearness. Fig. 2 is a developed diagrammatic view of the same, showing the field-magnet and field-winding and the armature-winding, the element undergoing commutation being shown in thicker lines than the other elements. Fig. 3 is a similar view to Fig. 1, showing the portions of each element distributed over several slots in the armature. Fig. 4 is a diagram of one element of a drum-armature winding constructed and arranged in accordance with my invention. Fig. 5 is a diagram showing a dynamo with slotted drum-armature provided with my improved winding, the two elements undergoing commutation being shown complete, the end connections of the other elements being omitted for clearness, the positive and negative directions of the currents in the whole winding being respectively indicated by black and dotted circles, the plain circles indicating the element under commutation. The large black and dotted circles indicate the direction of the currents in the field-winding. Fig. 6 is a developed diagram of such an improved drum-winding. Fig. 7 is a similar view to Fig. 5, but showing the portions of the element distributed over more slots in the armature, so that each bar of the element is in a different slot.

In Figs. 1, 2, and 3 of the said drawings, 1 and 2 are the field-magnet poles; 3, the field-winding (shown black and dotted to represent positive and negative directions, respectively;) 4, the magnetizing-space; 5, the ring-armature core, and 6 6$^a$ two portions of one of the elements of the Gramme winding connected to the consecutive commutator-sectors 7 7$^a$. In this example the element of the armature-winding comprises four turns divided into two unequal portions, 6 comprising three turns and 6$^a$ a single turn, the three turns leading. With such an element a balance would be obtained when the leading part was in a much weaker field than the lagging part—a condition obtainable by selecting a suitable span between the two portions of the element or by making the clearance greater at the horns 1$^a$ than at the horns 1$^b$. The effect of such an unequal division of the element on the magnetizing-space 4 is seen in Fig. 2, which shows that there is a considerable strengthening reaction in that space as the load comes on instead of the usual demagnetizing action. This strengthening reaction is applied exactly where it is most effective in magnetizing the armature. By proportioning the element in this way the armature reaction can be utilized either for strengthening or weakening the effective field—as, for example, by "compounding up" in a dynamo or "down" in a motor. Where one or each portion of an element of the winding consists of two or more turns, such turns may with advantage be distributed over several slots of the armature-core, as shown in Fig. 3, where the three coils of the leading portion 6 of the element are distributed over three slots. The disposition of the whole of the winding will be understood from Fig. 2.

In the arrangement shown in Figs. 4 to 7, inclusive, each element of the drum-winding consists of four bars 6$^a$, 6$^b$, 6$^c$, and 6$^d$, although there may be more, connected together and to the commutator-sectors 7 7$^a$ by conductors 6$^e$ at the ends of the armature, so as to form short and long chords in series, the latter in the example shown being across the diameter of the armature-core 5. By thus making the element of the drum-winding with two or more turns the bars composing such element can be so disposed as to enable the armature reaction to be utilized either for strengthening or weakening the effective field, as may be desired, as in the case of the modified Gramme winding hereinbefore described. In the example shown in Figs. 4 to 7, inclusive, the portion of the armature-winding in the magnetizing-space 4 will exert a useful reaction on the magnetic system, the current in three bars out of the four being in an assisting direction, corresponding to the direction of current in the adjacent part of the field-winding 3, so that such preponderance of armature-current will assist the field-magnet current. The four bars of each element in the construction shown in Fig. 5 are distributed over three slots, each of which contains four bars. In the construction shown in Fig. 7 each bar is located in a different slot, each of which contains only two bars. The latter construction is the better one electrically.

The application of the invention to multipolar machines, whether having slotted armatures wound in series or in parallel or in any other manner, will be understood without special description here.

It is to be understood that the term "dynamo" comprises generators and motors. The terms "chord" and "diameter" in this specification are to be taken as having their ordinary geometrical meaning only in the case of two-pole machines, a "diameter" meaning from center to center of adjacent poles.

What I claim is—

1. In a dynamo-electric machine, the combination with a field-magnet, of a slotted armature having each element of its winding divided into unequal portions.

2. In a dynamo-electric machine, the combination with a field-magnet, of a slotted armature-core provided with a winding comprising elements each of which is divided into unequal portions splayed or spaced apart.

3. In a dynamo-electric machine, the combination with a field-magnet and a commutator, of a slotted drum-armature provided with a winding each of the elements of which is composed of two or more connected chords one of which extends across the face of one of the field-magnet poles and another across the face of such pole and the gap between such pole and the next adjacent field-magnet pole.

4. In a dynamo-electric machine, the combination with a field-magnet and a commutator, of a slotted drum-armature provided with a winding each of the elements of which is composed of two or more chords arranged at an angle to each other and of different lengths, the longer one being approximately equal in length to a line extending from center to center of adjacent field-magnet poles.

5. In a dynamo-electric machine, the combination with a field-magnet and a commutator, of a drum-armature provided with a winding comprising elements each of which is connected at its ends to segments of said commutator and is composed of chords of different angle, substantially as described for the purpose set forth.

6. In a dynamo-electric machine, the combination with a field-magnet and a commutator, of a slotted armature-core provided with a winding comprising elements each of which is divided into separate portions spaced apart, one or each of said portions being distributed over two or more slots in said armature, substantially as described.

7. In a dynamo-electric machine, the combination with a field-magnet and a commutator, of a slotted armature-core provided with a winding comprising elements each of which is divided into separate portions spaced apart and distributed over three or more slots in said armature, substantially as described.

8. In a dynamo-electric machine, the combination with a field-magnet and a commutator, of a drum-armature having a winding each of the elements of which is composed of four portions two of which are near together and the other two are splayed or spaced apart to an extent approximately equal to the distance between adjacent magnetic poles, substantially as described for the purpose specified.

9. In a dynamo-electric machine, the combination of a field-magnet, a commutator, and a slotted drum-armature having a winding each of the elements of which is composed of a short chord and a long chord approximating to a diameter of the armature-core, substantially as herein described for the purpose specified.

10. In a dynamo-electric machine, the combination of a field-magnet, a commutator, and a slotted drum-armature having a winding each of the elements of which is composed of four, or a multiple of four, connected bars some of which are arranged separately in adjacent slots in the armature and the remainder are arranged in other and separate slots spaced at a distance apart, substantially as described.

Signed at 2 Pope's Head Alley, Cornhill, London, England, this 14th day of October, 1898.

WILLIAM MORRIS MORDEY.

Witnesses:
PERCY E. MATTOCKS,
EDMUND S. SNEWIN.